May 1, 1956 C. P. DUFFY 2,743,537
SELF-LOADING SHOVEL DITCHING MACHINE
Filed May 5, 1947 8 Sheets-Sheet 1
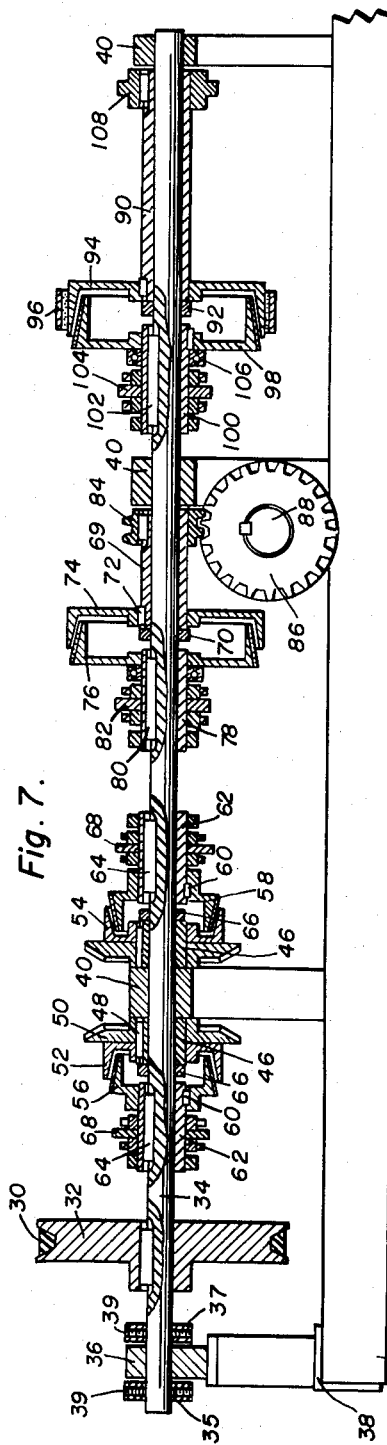
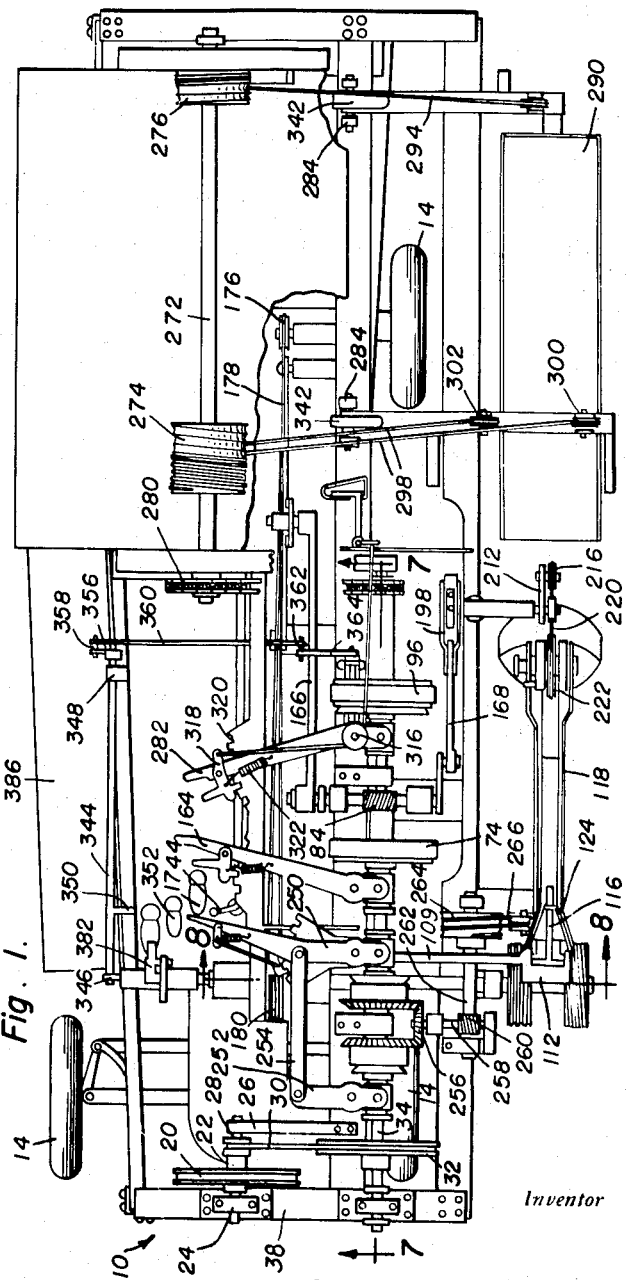
Inventor
Cyrus P. Duffy
By Clarence A. O'Brien
and Harvey B. Jacobson
Attorneys May 1, 1956 C. P. DUFFY 2,743,537
SELF-LOADING SHOVEL DITCHING MACHINE
Filed May 5, 1947 8 Sheets-Sheet 2

Inventor
Cyrus P. Duffy
By Clarence A. O'Brien
and Harvey B. Jacobson
Attorneys

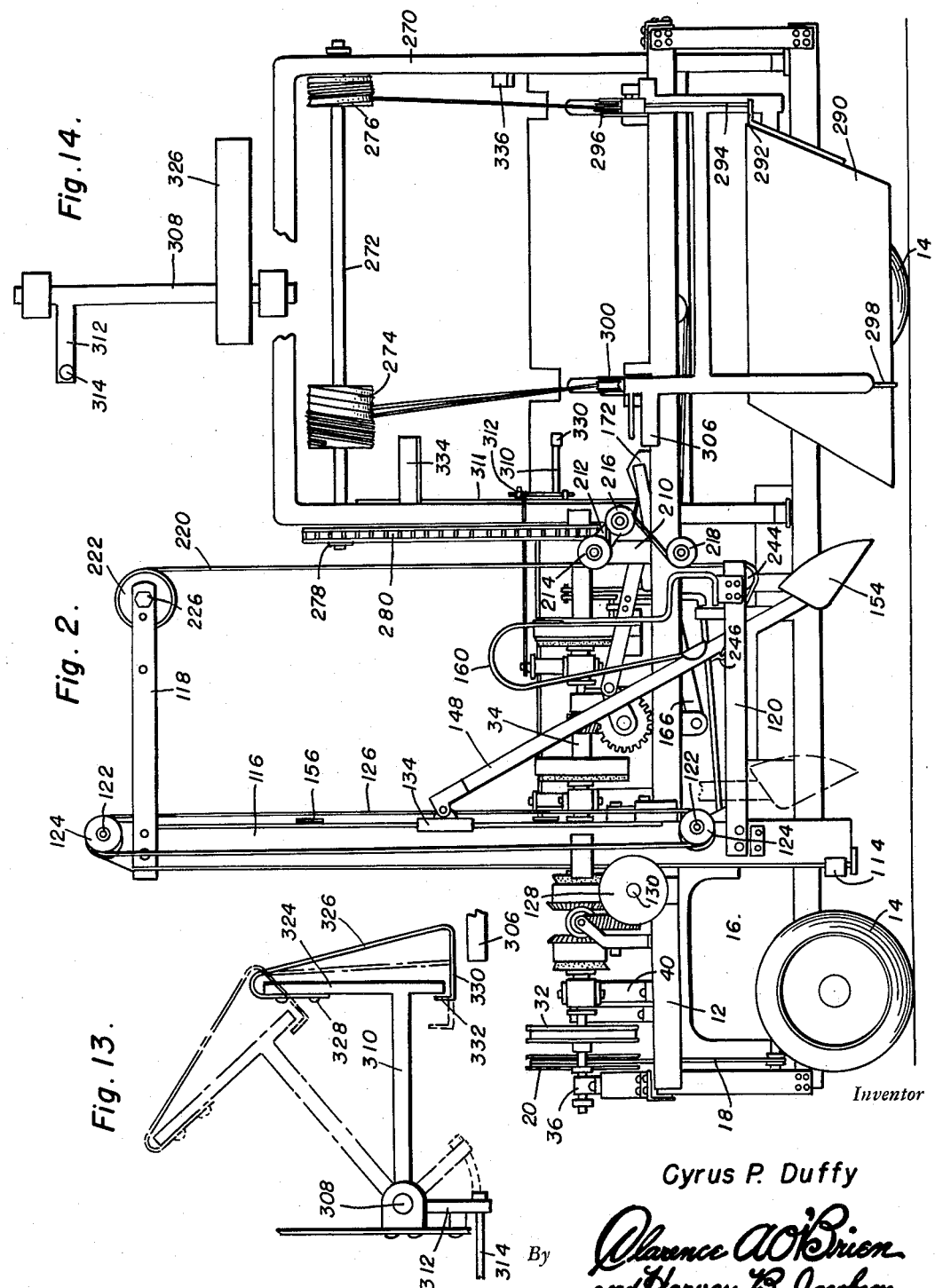

May 1, 1956 C. P. DUFFY 2,743,537
SELF-LOADING SHOVEL DITCHING MACHINE
Filed May 5, 1947 8 Sheets-Sheet 4
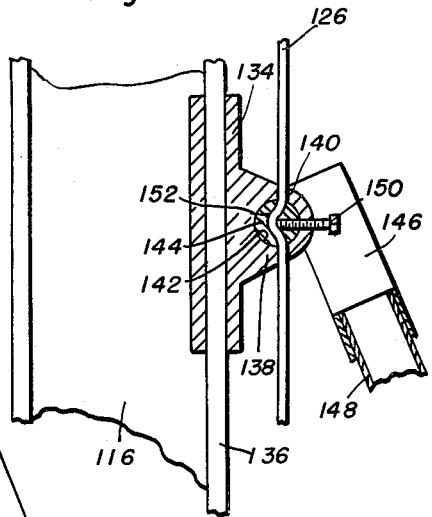
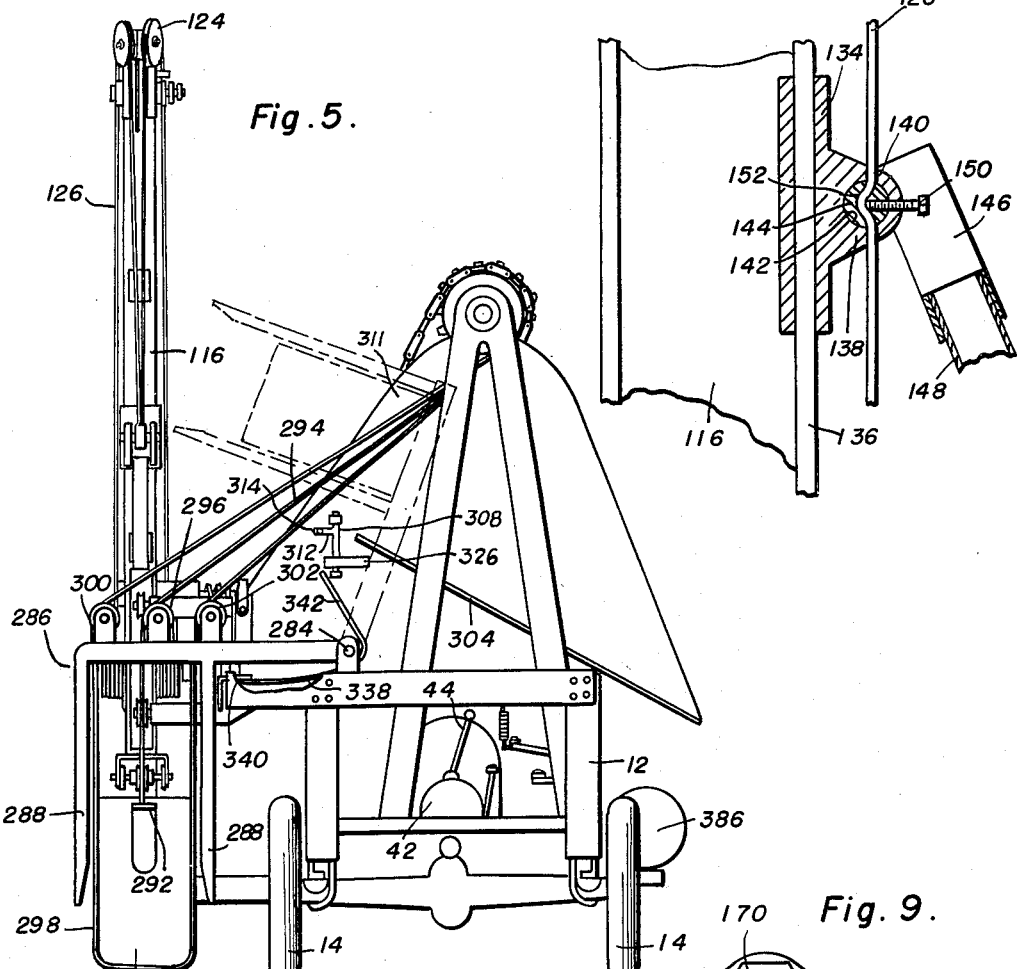
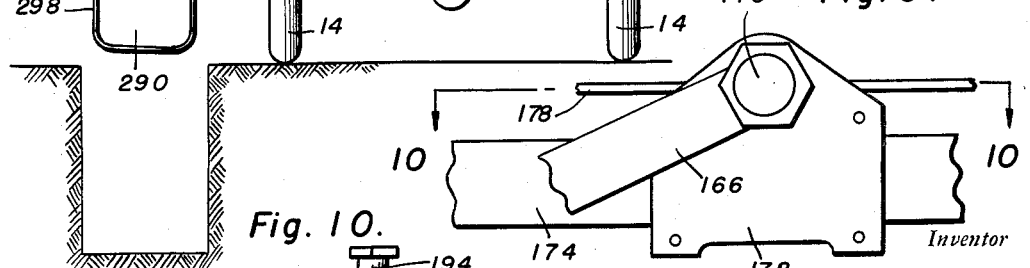
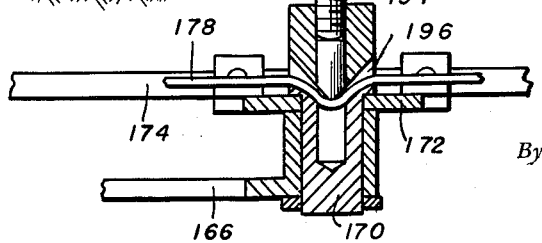
Inventor
Cyrus P. Duffy
By Clarence A. O'Brien
and Harvey B. Jacobson
Attorneys May 1, 1956 C. P. DUFFY 2,743,537
SELF-LOADING SHOVEL DITCHING MACHINE
Filed May 5, 1947 8 Sheets-Sheet 5
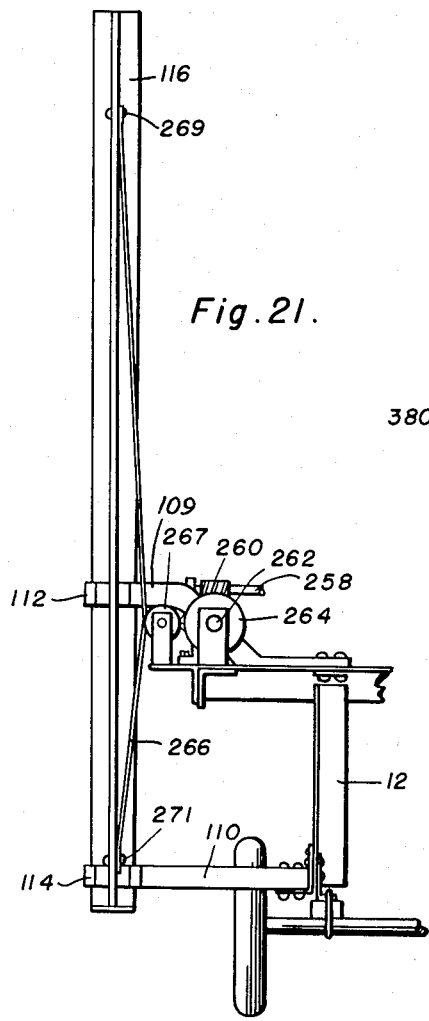
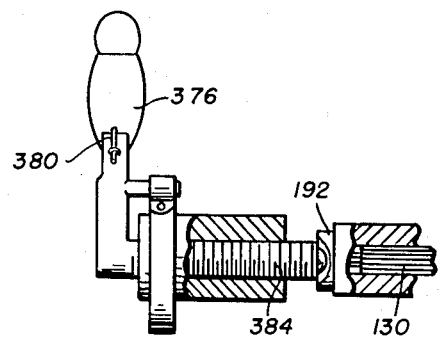
Inventor
Cyrus P. Duffy
By Clarence A. O'Brien
and Harvey B. Jacobson
Attorneys

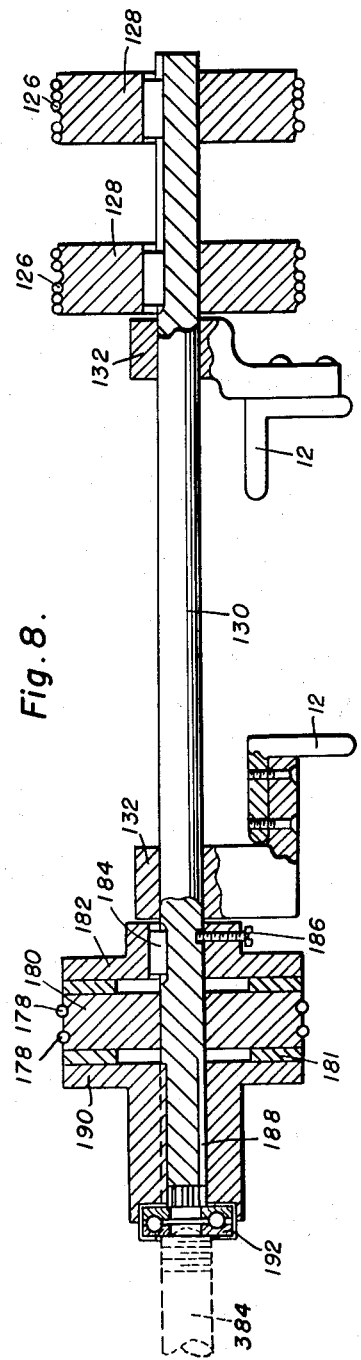
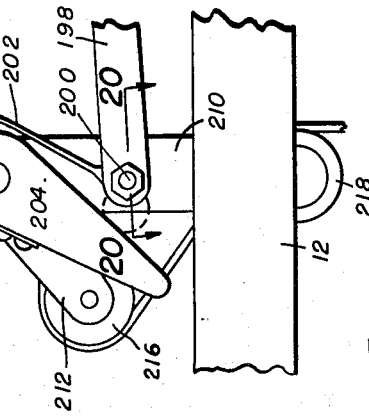
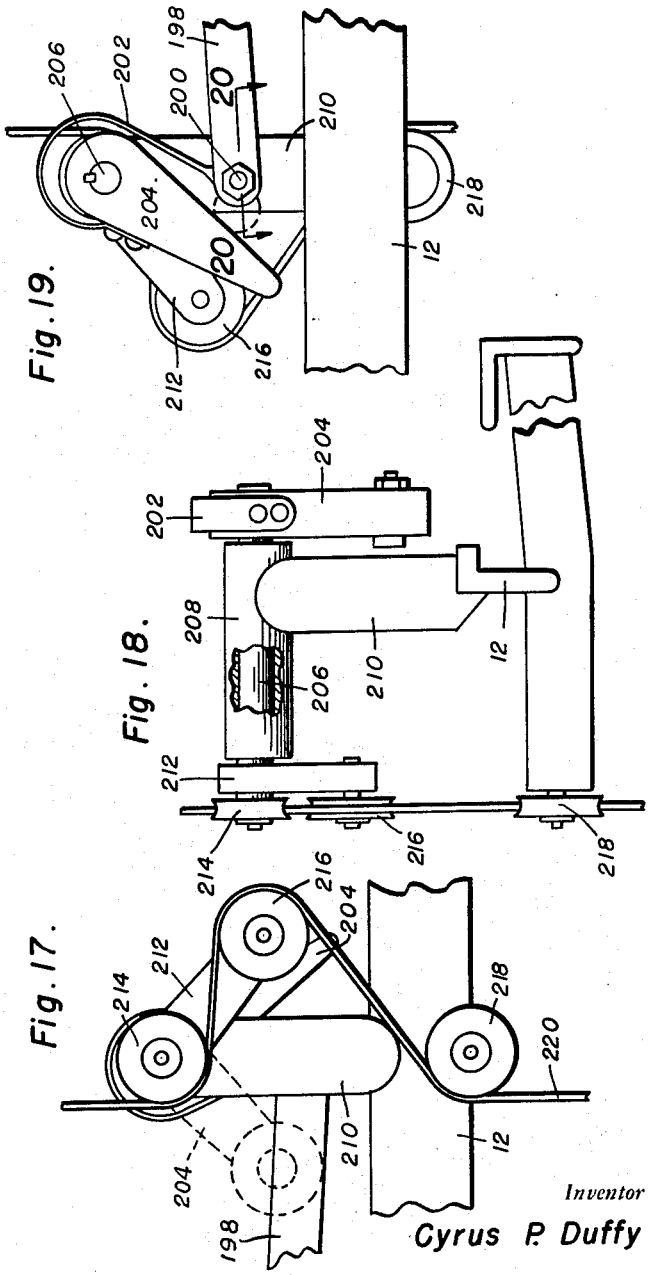

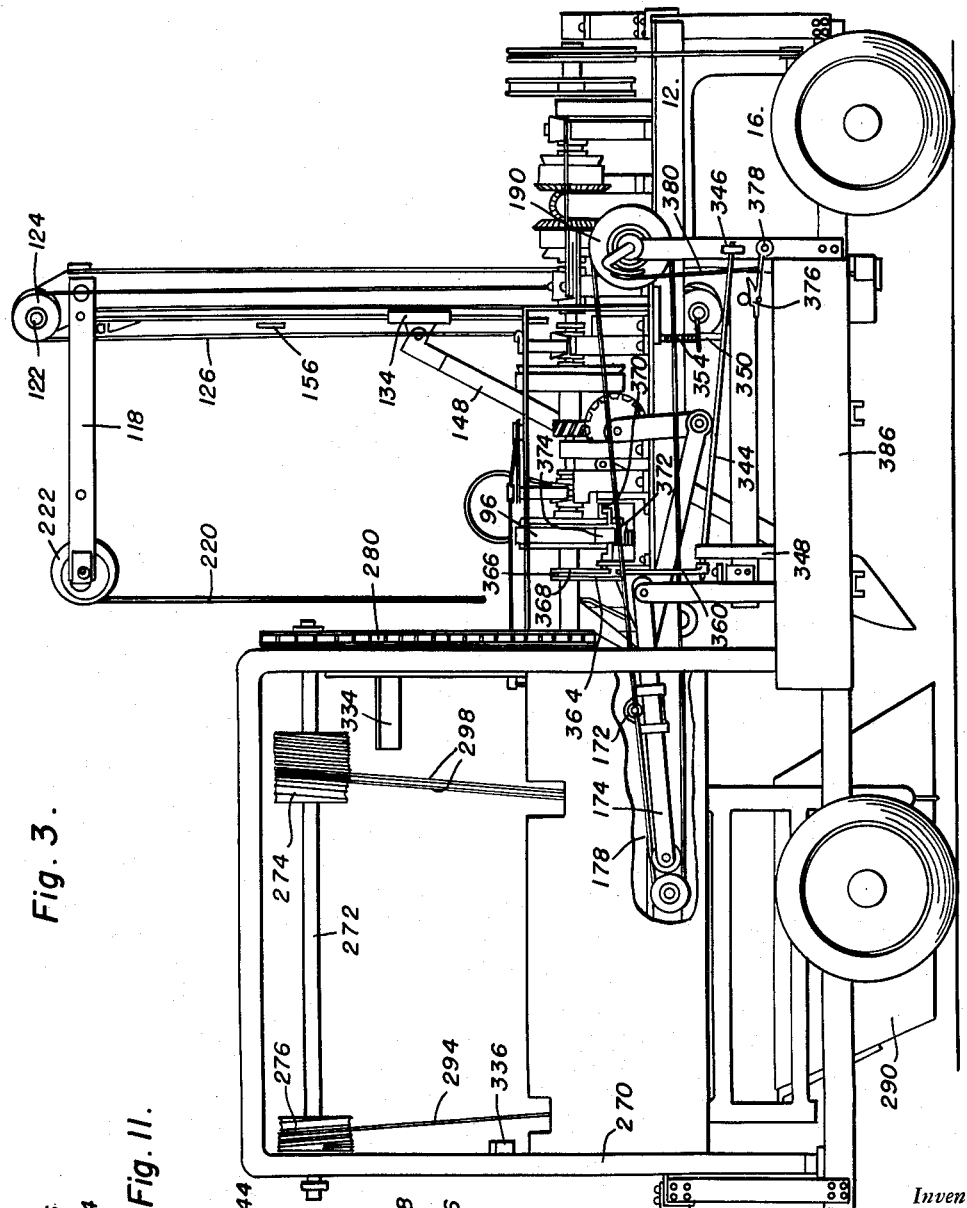
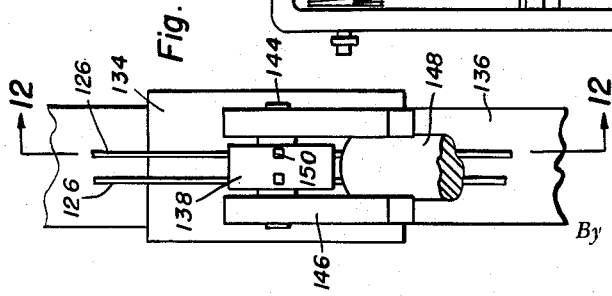

May 1, 1956  C. P. DUFFY  2,743,537
SELF-LOADING SHOVEL DITCHING MACHINE
Filed May 5, 1947  8 Sheets—Sheet 8
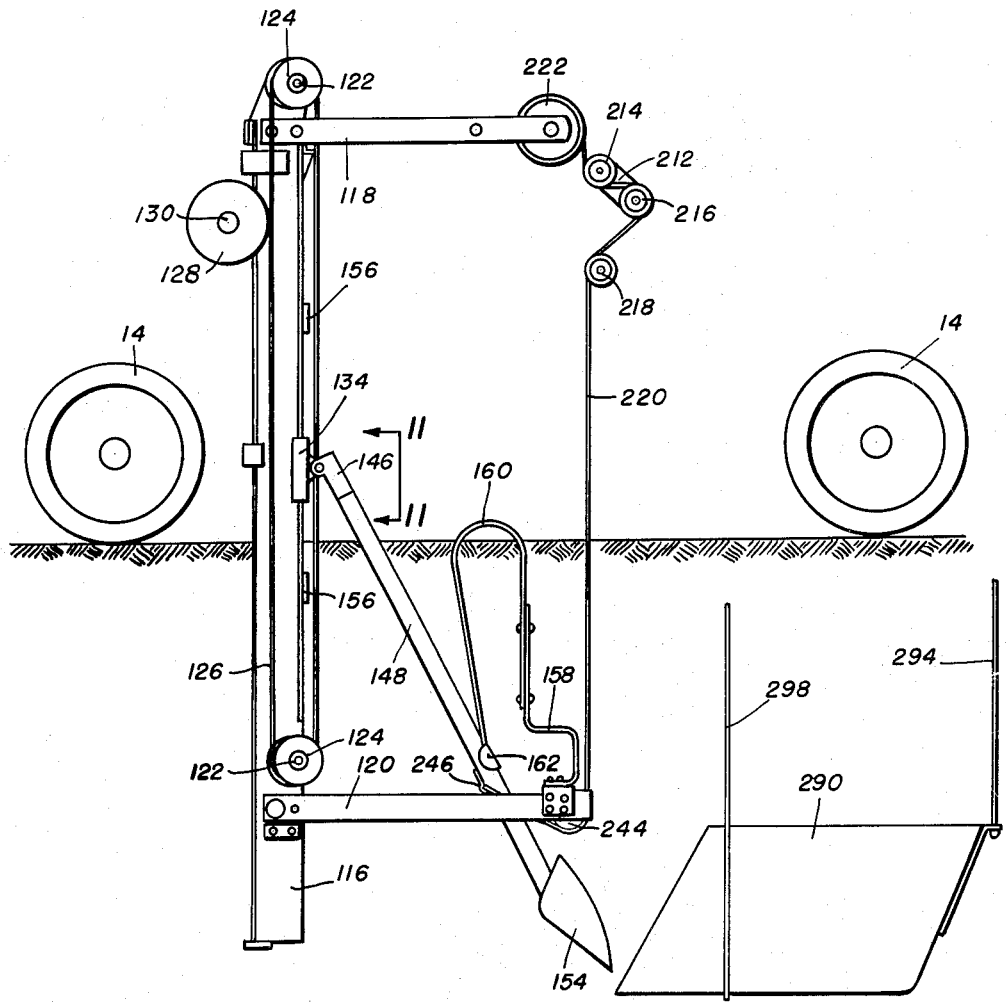
Fig. 6.
Fig. 20.
Inventor
Cyrus P. Duffy
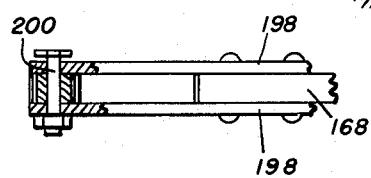
By Clarence A. O'Brien
and Harvey B. Jacobson
Attorneys

United States Patent Office 2,743,537
Patented May 1, 1956

2,743,537

SELF-LOADING SHOVEL DITCHING MACHINE

Cyrus P. Duffy, Brooklyn, N. Y.

Application May 5, 1947, Serial No. 746,055

5 Claims. (Cl. 37—4)

This machine comprises novel and useful improvements in ditching machines and more specifically pertains to an apparatus for digging ditches or other excavations by means of a power operated shovel digging implement of the spade type.

Principal objects of this invention reside in providing an excavating apparatus wherein the digging implement may be readily and easily controlled; may be operable in relatively restricted quarters; may be readily adjusted during operation to make excavations of varying depth; and which shall combine the known advantages of a reciprocating shovel for digging with power operating means therefor.

Further extremely important objects of the invention consist in providing an apparatus in accordance with the foregoing objects wherein the spade-like shovel digging element of the apparatus is given an accelerated lateral movement to scoop and throw material excavated into the collecting receptacle; wherein novel and highly efficient means are provided for adjusting the depth of penetration of the digging element; and wherein said adjusting means may be readily manipulated during operation of the device, and if desired may constitute a part of the excavating operating mechanism thereof.

Still further important purposes of this invention are to provide safety mechanisms for relieving the strain imparted to various parts of the apparatus by the striking of obstructions by the digging element; to further provide safety arrangements which shall effectively relieve the mechanism from strain both when the shovel encounters an obstacle during its penetration of the ground and also when an obstruction is met during the scooping action thereof; and to further provide such a means which shall not prevent the return of the shovel to its initial operative position after further operative movement thereof has been interrupted by the encountering of an obstacle.

Yet another important purpose of the invention resides in providing an apparatus in conformity with the foregoing objects, wherein a novel, improved and simplified power transmission means is provided for powering the various elements and instrumentalities of the digging mechanism from the power plant of a motor vehicle upon which the same is mounted.

And a final important aim of the invention, to be specifically enumerated herein, is to provide power operated means for raising and dumping a receptacle for the material excavated by the device, which shall be adjustable in conformity with the location of the excavation implement, which shall be provided with safety means for preventing undue travel of the receptacle under the impulse of the power operated means thereof; and wherein there is provided a spring return means for initially urging the receptacle towards its lowered position.

These, together with various ancillary objects of the present invention which will later become apparent as the following description proceeds, are attained by this device, a preferred embodiment of which has been illustrated by way of example only in the accompanying drawings, wherein:

Figure 1 is a top plan view of the apparatus in accordance with this invention, parts being broken away to show certain elements thereof;

Figure 2 is a side elevational view of the invention, parts being broken away and is taken from the left side of Figure 1, an alternative operational position of the shovel being shown in dotted lines;

Figure 3 is a further side elevational view of the invention, parts being broken away to show more clearly certain elements thereof and, is taken from the right side of Figure 1;

Figure 5 is a rear elevational view, partly diagrammatic, an alternative position of the receptacle being represented by dot and dash lines therein, the machine being shown in operative position relative to a ditch that is being excavated thereby;

Figure 6 is a diagrammatic elevational view of the shovel supporting mechanism and part of the operating mechanism thereof, the position of the parts being shown with reference to an excavation effected by the machine;

Figure 7 is a longitudinal vertical sectional view of the countershaft of the invention, the countershaft being generally shown in elevation with parts thereof being shown in section and broken away, and is taken substantially upon the plane indicated by the section line 7—7 of Figure 1;

Figure 8 is a fragmentary transverse vertical sectional view of the shovel drive spindle, parts being shown in elevation and parts in section, and is taken substantially upon the plane of the section line 8—8 of Figure 1;

Figure 9 is a fragmentary elevational view of a pitman slide construction forming an element of the shovel reciprocating mechanism;

Figure 10 is a fragmentary sectional detailed view taken substantially upon the plane of the section line 10—10 of Figure 9;

Figure 11 is a fragmentary elevational view of the pivotal portion of the construction of the shovel guide fulcrum, and is taken substantially upon the plane of the section line 11—11 of Figure 6;

Figure 12 is a fragmentary vertical longitudinal sectional view taken upon the plane of the section line 12—12 of Figure 11;

Figure 13 is an enlarged elevational view of a portion of the receptacle control mechanism, an alternative position thereof being indicated in dotted lines;

Figure 14 is an end elevational view of the construction shown in Figure 13;

Figure 17 is an enlarged fragmentary side elevational detailed view of a portion of the shovel swinging mechanism;

Figure 18 is an enlarged fragmentary end elevational view of Figure 17;

Figure 19 is an enlarged fragmentary rear elevational view of Figure 17;

Figure 20 is a fragmentary detailed view in section substantially upon the plane of the section line 20—20 in Figure 19;

Figure 21 is a diagrammatic elevational view of the shovel fulcrum support beam and its elevating mechanism, parts being omitted; and, Figure 22 is an enlarged detail view in top plan, parts being shown in section of the clutch release mechanism for the shovel operating spindle.

Figure 4:
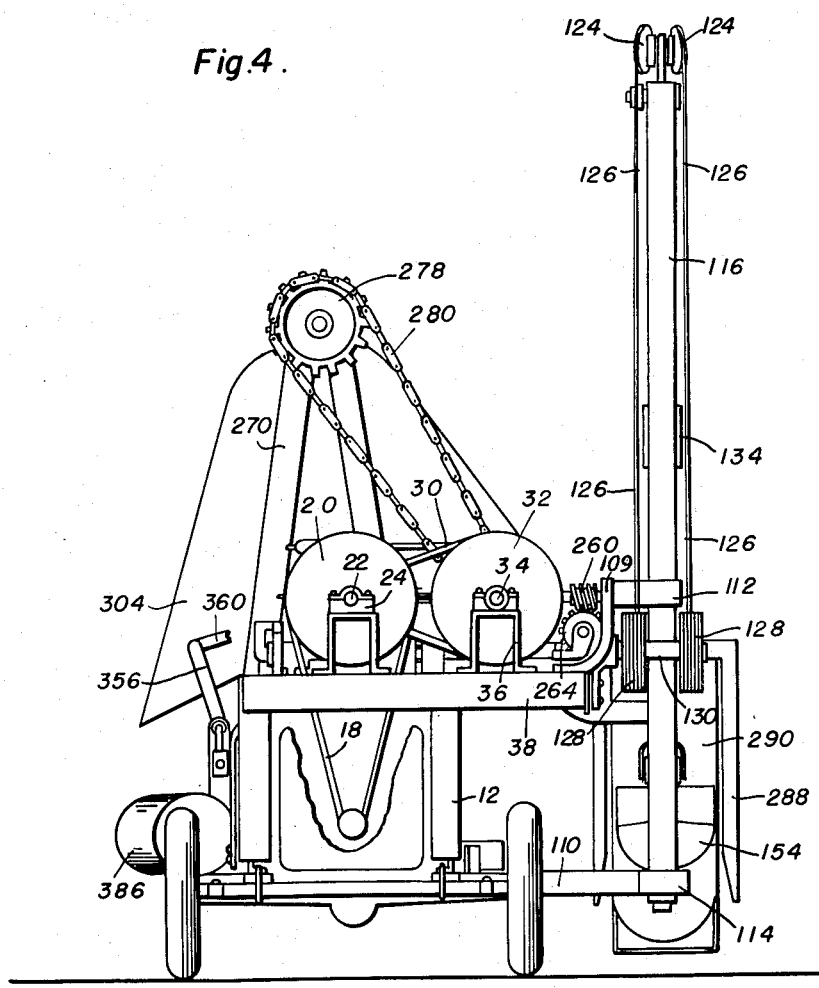
Figure 4 is a front elevational view of Figure 1, parts being broken away to show certain concealed structure.

Referring now more specifically to the accompanying drawings, wherein like numerals designate similar parts throughout the various views, attention is directed chiefly to Figures 1–5 for an understanding of the general construction and arrangement of the apparatus which, as illustrated, although the utility of the invention is not limited thereto, is mounted or constructed upon a truck or other self-propelled motor vehicle. As shown, a motor truck 10 is provided with a suitable support bed or framework 12, see also Figure 7, constituting a support base for the excavating apparatus to be herein disclosed. The truck is of course provided with suitable wheels 14, and with a motor or power plant indicated at 16 provided with the usual vehicle clutch pedal 17, Figure 1, suitably mounted in the chassis of the vehicle, together with the customary transmission 42 and gear shift lever 44, see Figures 1 and 5.

As seen in Figures 1, 2 and 4, the motor 16 operates by means of a belt or chain 18, a pulley or wheel 20 which is keyed or otherwise secured to a lay shaft 22 suitably mounted as by bearings 24 and 26 from any convenient portion of the bed or frame of the device.

The lay shaft is further provided with a pulley 28 which by means of a belt or chain 30 is operatively connected to a driven pulley 32 fixedly secured to a countershaft 34 whose construction is shown best in Figure 7, which shaft is journalled at its forward end in a bearing 36 carried by a side arm 38 of the framework supporting a lateral extension of the above mentioned bed 12. Throughout its length, the countershaft 34 is further provided with suitable bearings 40 for supporting the same from the framework 12. The countershaft is maintained against axial displacement by a pair of collars 35 and 37 secured thereto by set screws 39 and abutting opposite sides of bearing 36.

It will thus be seen that the countershaft 34 derives its power from the motor or power plant of the truck, and is maintained in continuous rotation during operation of the motor 16. By suitable control means to be hereinafter described, the various instrumentalities of this invention selectively obtain their power from this constantly rotating countershaft.

Attention is now directed chiefly to Figure 7 for a clearer understanding of the power take-off connections of this countershaft. Adjacent its forward end, and upon opposite sides of one of the bearings 40, the countershaft 34 has loosely journalled thereon a pair of sleeves 46 upon which are keyed as at 48, a pair of inwardly facing bevel gears 50 having outwardly extending lateral female clutch surfaces, indicated at 52 and 54. The latter are selectively engageable by male clutch members 56 and 58 respectively which are each keyed at 60 to sleeves or bushings 62 which in turn are keyed or splined as at 64 to the countershaft 34.

Each of the female clutch members 52 and 54 are rigidly attached to and carried by the bevel gears 50, and are removably secured upon the sleeves 46 by the above mentioned splines or keys 48; and these sleeves are in turn removably attached and secured upon the shaft 34, although freely revoluble thereon, as by suitable fastening means such as collars 66. Each of the sleeves or bushings 62 is provided with a control means indicated generally at 68, whereby the same may be manipulated by clutch levers for axially sliding the sleeves 62 upon the shaft 34 by means of the spline connection 64, to selectively engage or release the cooperating clutches 52, 56 and 54, 58 respectively, thereby alternatively operating the bevel gears 50. These bevel gears thus provide a reversible drive for controlling the depth of excavation of the shovel in a manner to be subsequently set forth.

Freely journalled upon the shaft 34, adjacent the next of the bearings 40, there is a further sleeve 69 detachably secured upon the shaft as by a collar 70 and having keyed thereto, as at 72, a female clutch element 74. A cooperating male clutch member 76 is rigidly carried by a sleeve 78 which is keyed or splined as at 80 for longitudinal movement upon the countershaft 34, under the control of clutch control connecting means indicated generally at 82. Rigidly carried by the sleeve 69 is a worm gear 84 which drivingly engages a helical gear 86 secured to a transversely disposed shaft 88 for actuating the swinging means and the reciprocating means of the shovel, as will be subsequently set forth. As will be evident, upon manipulation of the control means 82, the sleeve 78 is slid axially of the shaft 34 and the male clutch member 76 is selectively engaged or released from the female element 74, to thereby establish or disconnect the shaft 34 from driving engagement with the shaft 88.

Freely journalled on the shaft 34 adjacent its innermost bearing 40, is a fourth sleeve 90 which is detachably secured upon the shaft in the desired position longitudinally thereof as by the fastening collar 92. Rigidly attached to the sleeve 90 is a fourth female clutch member 94 whose outer surface provides an annular brake member engageable by a brake band 96. A complementary male clutch member 98 is rigidly attached to a sleeve 100 axially splined as at 102 to the shaft 34, and controlled by clutch connecting means 104, a ball bearing or other thrust bearing 106 being interposed between the clutch control connection 104 and the member 98. Keyed or otherwise fixedly secured at its inner extremity, the sleeve 90 is provided with a sprocket or other power take-off means 108. As will be apparent, the sprocket 108 upon its carrying sleeve 90 is freely revoluble upon the countershaft 34, except as controlled by the brake band 96 in a manner to be set forth hereinafter. The control means 104 may be manipulated to axially slide the sleeve 100 and the clutch element 98 carried thereby, into operative engagement with the clutch element 94, to selectively impart rotation to the sleeve 90 and sprocket 108 for a purpose to be later set forth.

Attention is now directed chiefly to Figures 1, 2, 5 and 6, together with Figures 11 and 12 for an understanding of the construction of the shovel and its support. Extending laterally from the frame of the truck 10, see Figure 21, are a pair of vertically spaced support arms 109 and 110, see Figure 21, which are provided with guides 112 and 114 respectively and within which is vertically slidable a beam 116 which is I-shaped in cross-section and which constitutes a fulcrum support for the shovel implement of the excavator.

Rigidly extending (Figures 2, 6) from adjacent the top and bottom of the I-beam 116, are a pair of parallel cantilever beams 118 and 120 respectively. Journalled upon axles 122 at the upper and lower portions of the I-beam 116 are oppositely disposed pairs of pulleys 124 over which are trained a pair of endless cables 126. As shown best in Figure 4, each of the cables 126 is wound about a drum 128 rigidly carried by a shaft or spindle 130 which is suitably journalled as indicated in Figure 8, in a pair of bearings 132 conveniently mounted upon the frame members 12. The arrangement is such that upon oscillation of the shaft 130, the cables 126 will be caused to rotate in reverse directions upon the pulleys 124.

As shown best in Figures 6, 11 and 12, it will be seen that a slide 134 is adapted to slidably embrace the inner flange 136 of the I-beam 116 for vertical guided sliding movement thereon. The slide is provided with an outwardly extending lug 138 through which extend a pair of longitudinal channels 140 for loosely receiving the endless cables 126. Extending transversely through the lug 138 is a cylindrical bore 142 accommodating a pivot pin 144 upon which is journalled a bifurcated end 146 of a shovel handle 148. Suitable set screws 150 extend through the lug 138, the pivot pin 144, and into channels 152 in said pivot pin, which channels align with the bores 140 above mentioned. The arrangement is such that the slide 134 with the shovel handle 148 pivoted thereto, may be readily adjusted upon the endless cable 126, and when so positioned may be retained in adjustment by tightening the set screws 150, thereby clamping the slide to the cable. As a result of this construction, oscillation of the cable 126 will result in a vertical reciprocation of the slide 134 and of the pivot 144 constituting the fulcrum of the shovel handle 148.

At its lower end, the shovel handle 148 is provided with a scoop or excavating blade 154 of any desired shape or type. Obviously, upon downward movement of the slide 134 and shovel handle 148, the blade 154 will be caused to penetrate the earth for excavating the same.

Upper and lower stops 156 are suitably positioned upon the beam 116 for limiting the upper and lower limits of travel of the slide 134 as shown in Figure 6. If desired, these stops may be manually adjusted upon this beam in order to obtain a predetermined length of stroke of the shovel.

As shown best in Figure 6, the outer extremity of the lower cantilever member 120 is provided with an upstanding support 158 to which is secured a flexed leaf spring 160, whose lower end is shaped to provide a guide 162 slidably received upon the shovel handle 148. The spring 160 is provided with a natural bias for yieldingly urging the shovel handle 148 into its vertical position in readiness for effecting another downward excavating stroke. As the shovel and shovel handle are reciprocated by the movement of the slide 134, the handle will slide through the guiding member 162, for guiding the same. As shown in Figure 1, manipulation of the clutch lever 164 will operate the clutch members 74 and 76 through the above mentioned connection 82, and thereby cause rotation of the transverse shaft 88 whose outer extremities are provided with crank arms upon which are journalled connecting rods 166 and 168 respectively. The lower connecting rod 166 (see Figure 9) at its outer end is pivotally connected as at 170 to a slide 172 which has longitudinal movement upon a guide bar 174 suitably mounted upon the frame of the device. The construction of this pivotal connection and of the slide is clearly shown in Figures 9 and 10.

Suitably journalled on a portion of the frame is a guide pulley, as shown at 176 in Figure 1, and an endless cable 178 is entrained over this pulley and also over a pulley member 180 which is freely rotatable upon the spindle 130, as shown in Figure 8. The sides of this pulley are faced with a friction lining 181, for clutching engagement with a fixed clutch disk 182 removably secured as by a spline 184 and set screw 186 to the spindle 130. Splined as at 188 to the spindle 130 for axial movement thereon, is a clutch pressure plate 190 which is provided with a thrust bearing 192 for causing a clamping pressure engagement between the clutch members 182 and 190 and the rotating element 180. Obviously, when appropriate pressure is applied between these clutch elements, rotation of the endless cables 178 and of the pulley 180 will through the clutch lining 181 cause corresponding rotation of the spindle 130. As shown best in Figures 9 and 10, the cables 178 are adjustably secured as by means of clamping screws 194, into bores 196 extending through the pivot 170 carried by the slide 172. Thus, oscillation of the slide 172 by the connecting rod 166 by means of the mechanism hereinbefore mentioned, will result in a reciprocation of the cables 178, and thus in an oscillation of the shaft or spindle 130.

Figure 16:
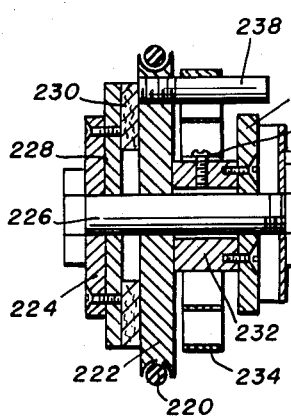
Figure 16 is a detailed view, taken substantially upon the plane of section line 16—16 of Figure 15.
Figure 15:
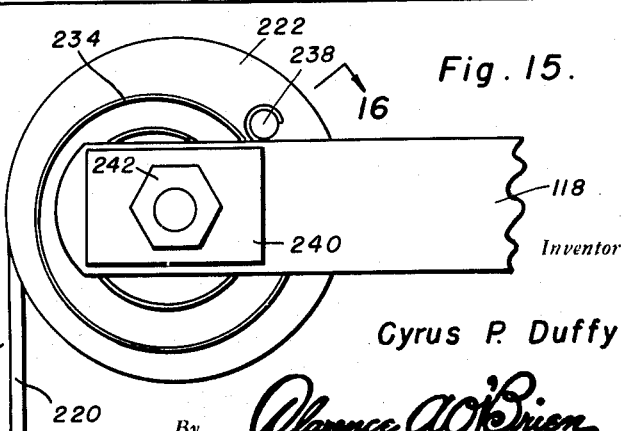
Figure 15 is an enlarged fragmentary sectional view of a yielding release element of the shovel swinging mechanism.

The connecting rod 168 at its outer extremity is provided with a yoke or bifurcated extremity 198, see Figures 17 through 20, through which extends a pivot pin 200. This pivot pin 200 is connected to the end of a leaf spring member 202 which is bent about and has its upper extremity secured to a lever 204 rigidly attached to a rocker shaft 206 journalled in a bearing 208 carried by a support 210 suitably mounted upon the frame 12. At its other extremity, the shaft 206 is provided with a rigidly attached lever arm 212, a guide pulley 214 being journalled on the outer extremity of the shaft 206 beyond the lever 212, while a second guide pulley 216 is journalled upon the other extremity of the lever 212. Suitably journalled upon the frame is a third guide pulley 218. As shown in Figures 2 and 6, a cable 220 has its lower extremity trained over a pulley 244 at the outer end of the cantilever beam 120, is then trained over the guide pulleys 218, 216, and 214, and thence extends over a yieldable pulley construction 222, carried by the upper cantilever beam 118. As shown in Figures 15 and 16, the cable 220 is suitably entrained over the pulley 222 and conveniently anchored thereto at its end, this pulley being rotatably mounted upon a bolt 226 extending through the parallel sides 224 of the bifurcated end of the cantilever 118. Rigidly mounted upon the inner surface of one of the side plates 224 of the bifurcations, is a clutch plate 228 provided with friction lining 230, slidably engaging one side of the pulley 222, while an annular sleeve 232 secured to the inner surface of the other side plate 224 abuts the other side of the pulley 222. A torsion spring 234 has its inner end secured as at 236 to the sleeve 232, while its outer end embraces and engages a pin 238 extending laterally from the pulley 222. A leaf spring 240 is interposed between an adjusting nut 242 carried by the end of the bolt 226, and the outer surface of one of the plates 224 for yieldingly pressing the elements together.

The arrangement is such that by tightening the nut 242 upon the bolt 226, the leaf spring 240 will apply a predetermined and adjusted tension between the friction lining 230 and the pulley 222 for imparting a predetermined resistance to rotation of the pulley 222 of the pivot formed by the bolt 226. An additional torsion or resistance to rotation of the pulley is supplied by the torsion spring 234. The arrangement is such that the lower end of the cable 220 which is trained over a pulley, not shown, but journalled in the outer end of the cantilever 120, behind the bracket 244, and is secured as at 246 to the shovel handle 148, will produce an oscillation of the shovel handle about its pivot on the slide 134, in response to oscillation of the lever arm 212 and the pulley 216, as the shaft 206 is rocked or oscillated by the lever 204 in response to the reciprocation of the bifurcated ends 198 of the connecting rod 168.

Obviously, the two connecting rods 166 and 168 will be so timed as to give the desired path of travel to the shovel handle and scoop, whereby the shovel will vertically penetrate the ground, and after the completion of its downward stroke, will be lifted by energization of the above mentioned cable 220 against the opposition of the spring 160. When the connecting rod 168 releases the cable 220, the spring 160 will restore the shovel to its vertical position in readiness for the next stroke. Thus, it will be seen that the connecting rod 166 and associated mechanism produces a vertical reciprocation of the shovel, while the connecting rod 168 together with its associated mechanism produces an arcuate movement of the shovel. These two motions are compounded to cause the shovel to penetrate the ground, to scoop up a portion thereof and lift the same. When the shovel 154 is scooping earth, the dirt accelerator spring 202, Figure 19, yields under the heavy load that is on the cable 220 and the arm 204 comes against the ends 198. As the shovel is lifted from this earth and the load on cable 220 is thereby reduced, the spring 202 is then strong enough to give the arm 204 a spurt or shove backward and acting through the means already described, gives the shovel 154, a backward thrust or acceleration. This thrust or acceleration keeps the scooped dirt from dropping out of the shovel and also gives such dirt the added momentum needed to carry it into the receptacle at the end of the stroke of the shovel. At the limit of its delivery stroke, the tension of cable 220 is relaxed by movement of lever 212 and roller 216 and the spring 160 imparts a snap action withdrawal to the shovel, thereby throwing or discharging its contents. If during its lifting movement and delivery motion, the shovel should strike an obstruction such as a rock or the like, the additional strain imparted to the cable 220 would exceed the tension for which the clutch mechanism of the pulley 222 has been adjusted, and accordingly, the torsion spring thereof would permit the cable 220 to yield, thereby stopping further travel of the shovel against the obstruction. However, the continued upward travel of the slide 134 would now cause withdrawal of the shovel from its obstacle, and as soon as this has been effected the disengagement of this resistance would permit the torsion spring to again restore the pulley 222 to its normal rested position in readiness for the next actuation of the cable 220. In order to prevent damage to the shovel and its operating mechanism, during the downward or penetrating stroke of the device, the clutch engagement between the members 180, 182 and 190 is relied upon. Obviously, this frictional resistance between these clutch members may be so regulated as to permit slippage between the driving element 180 and the driven elements 182 and 190 which are keyed to the spindle 130, whereby the spindle may remain idle during the rest of the stroke or rotation of the element 180 and its associated mechanism, without imparting any excessive strain thereto. When the member 180 reverses its rotation, the spindle 130 is now reversed in its movement, thereby causing the drums 128 and cables 126 to retract or elevate the shovel to its original position. In this operation it should be noted that the stop means 156 will limit upward or downward travel of the shovel, since when the slide engages either stop, further movement is arrested and slippage of the clutch members 180, 182 and 190 will occur as aforesaid. As soon as the shovel has been disengaged from its obstruction, it will be evident that the next movement of the mechanism will operate the slide until it engages one of the stops, whereupon movement is arrested, the clutch will slip and the slide and shovel will be again brought to their initial proper position for actuation.

Attention is directed more particularly to Figures 1, 4, 7 and 21 for an explanation of the means for raising or lowering the beam 116 constituting the guide for the sliding fulcrum of the shovel. Member 250 is connected to lever 252 by a link 254, for simultaneous but reverse operation of the clutch members 56 and 58 and consequently for reversible driving engagement by the bevel gears 50 of a driven bevel gear 256 carried by a shaft 258 which in turn is geared as at 260 to a side shaft 262 carrying a drum 264 thereon. Wound upon this drum is an endless cable 266 which has its ends entrained over and under a guide pulley 267 suitably mounted, and is terminally connected at 269 and 271 respectively to the beam 116. The arrangement is such that by engaging the proper clutch member, the drum will be rotated and by means of the endless cable 266, the upper cantilever beam 118, the I-beam 116 and the lower cantilever beam 120 carried thereby will be selectively raised or lowered, thereby elevating or depressing the position of the shovel in order to vary the depth of excavation. The cable 266 thus carries the thrust of the shovel operating mechanisms.

Attention is now directed chiefly to Figures 1–5 for an explanation of the operation of the receptacle by power means in accordance with this invention. Suitably mounted upon the rear portion of the truck, is a superstructure or framework 270 upon which is journalled a shaft 272 having a pair of drums 274 and 276 respectively. At its extremity, the shaft 272 is provided with a sprocket 278 connected as by a sprocket chain 280 with the previously mentioned sprocket gear 108 which is controlled by the clutch members 94 and 98, under the actuation mentioned connecting means 104. Pivoted or hinged to the frame 270 as at 284 is a carriage 286 having parallel downward extending guide arms 288. Loosely but guidingly received within these depending arms 288, is a receptacle 290 having an open front end positioned in alignment with the path of travel of the shovel 154, for receiving the material discharged thereby. At its rear end, the receptacle 290 is provided with a support bracket 292 for engagement by the end of a lift cable 294 which is entrained over a guide pulley 296 carried by the carriage 286, and which then is secured to the drum 276. At its open or front end, the receptacle 290 is encircled by a cable 298, whose two extremities are secured to the drum 274, and which is entrained over a pair of guide pulleys 300 and 302 suitably supported upon the top of the carriage 286. The arrangement is such that upon proper manipulation of the driving means, the receptacle will be lowered from between the depending arms 288 into the trench or other excavation where the same may be loaded by manipulation and operation of the shovel means. When it is desired to dump the receptacle, the shaft 272 is energized, whereupon the cables 294 and 298 are reeled in by the drums 274 and 276, thereby drawing the receptacle up between the guides 288 until it is in contact with the top of the carriage. Continued reeling in of the cables now pivots the carriage and the receptacle secured thereto about the pivot point 284, until the same reaches the dotted line position shown in Figure 5, whereupon the contents are discharged upon a chute 304 for suitable disposal.

In order to render the operation of the receptacle more automatic and therefore easier to control, an automatic cut-off of the driving power for raising the receptacle is provided. For this purpose, a lug 306 extends laterally from the carriage 286, and constitutes an actuating means for a trigger mechanism to be now described. Pivotally mounted between a pair of lugs at a suitable point upon a plate 311 constituting a part of the frame of the machine, by a pivot pin 308, is a bellcrank having a trigger arm 310 disposed in the path of movement of the lug 306, and is positioned to be actuated by the same just before the receptacle reaches the top of its travel as shown in dotted lines in Figure 5. As shown best in Figures 1, 13 and 14, the trigger arm 310 has rigidly secured thereto an operating arm 312 which is operatively secured to the end of a cable 314. The cable 314 passes over a guide 316 mounted upon the lever 282, and from thence extends up said lever and is connected at its extremity to the latch means 318 pivoted upon the lever and selectively engageable with a notched quadrant 320 suitably carried by the frame of the device, which latch means is yieldingly engaged with the quadrant as by a spring 322 for maintaining the lever in a desired predetermined position of adjustment.

As shown best in Figure 13, the outer extremity of the trigger arm 310 of the bellcrank is provided with a perpendicularly disposed portion 324, which has a resilient spring member 326 secured thereto as at 328. This leaf spring member is secured to the outer extremity of the arm 324, and is folded back thereover, and is angularly inclined thereto, terminating at its free extremity in an inwardly positioned portion 330 having a perpendicularly disposed catch or hook 332.

The arrangement is such that just as the receptacle carriage approaches the upper extremity of its desired movement, the lug 306 engages the portion 330 of the resilient member 326, and thus pivots the bellcrank about the fulcrum 308, actuating the cable 314 to release the latch 318 against the action of spring 322, whereby the lever 282 may move to its clutch disengaging position by a resilient means, not shown. This movement of the lever disengages the clutch, whereby the shaft 272 is disengaged from the driving means connecting the same to the countershaft 34. The engagement of the lug 306 with the trigger member occurs just before the carriage reaches its top position, thereby disconnecting the power from the carriage elevating means; and the momentum of the carriage and receptacle completes the upward swing of the carriage until the latter is stopped by the two stop lugs 334 and 336 carried by the frame 270. During this final upward movement of the carriage and receptacle, the trigger mechanism is shifted from the full line position shown in Figure 13 to the dotted line position shown therein, and if the lug 306 should slip from and past the portion 330 due to the movement of the latter, the inclined surface of the spring 326 will be compressed by the lug 306 on the downward or return movement of the latter, to allow the lug to pass by the trigger whereby these parts may assume their intended normal position.

Ordinarily, the center of gravity and weight of the receptacle and its carriage will be found sufficient to return the parts from their elevated to their lowered positions when the driving connection has been disengaged from the shaft 272 as above mentioned. However, the return operation may be facilitated and further insured by the provision of one or more spring buffers (see Figures 2 and 5) which consist of leaf spring members having one extremity 338 anchored to a portion of the frame as at 340, and extended and bent about a hinge pivot pin 284 with its upper extremity 342 bent outwardly and disposed into the path of travel of the carriage 286 in the uppermost position of the latter. Obviously, these buffers engage the carriage before the same has reached its uppermost position, and cushion the upward stroke as well as yieldingly urge the carriage upon its return movement.

Attention is now directed more specifically to the brake means for locking the carriage and receptacle in any position in their path of movement. As shown best in Figures 1 and 3, a rocker shaft 344 is rotatably journalled in suitable bearings 346 and 348, in an inclined position in suitable supports at the right side of the frame of the truck. Adjacent its front end, the rocker shaft is provided with a laterally extending arm 350 having a brake pedal 352 secured thereto in convenient position for manipulation by the operator of the machine from his position within the cab of the device, not shown. Suitable spring means, such as that indicated at 354, may be relied upon for biasing the pedal, arm and rocker shaft to their brake releasing position.

Adjacent the other extremity, the rocker shaft is provided with an oppositely extending arm 356, to which is pivotally connected as at 358, a connecting link 360. The link 360 is pivotally connected as at 362 to a second link or rod 364 which is in turn pivoted as at 366 to a crank lever 368 rigidly secured to the end of a crank shaft 370 suitably journalled in the frame of the device. The shaft 370 is provided with a crank 372 upon which is pivotally connected the end portion 374 of the annular brake band 96 above mentioned and which as shown in Figure 7, surrounds the outer surface of the clutch and brake member 94.

The operation of the brake is as follows. Upon depression of the foot pedal 352 against the opposition of the spring 354, the lever 350 will rotate the rocker shaft 344, and by means of the above mentioned linkage will cause rotation of the crank shaft 370. The arcuate movement of the crank 372 thereof, will thus tighten the brake band 96 about the member 94, and prevent rotation of the sleeve 90 with the driving cog 108 secured thereto. Thus, the engagement of the brake will positively lock the members 90, 272, drums 274 and 276, and thus secure the carriage 286 attached thereto, in any desired position of adjustment. As shown in Figures 1 and 3, a pedal operated means is provided for selectively releasing the frictional engagement of the clutch members 190, 180 and 182, see Figure 8, in order to disengage the operating mechanism of the shovel, in order to better control manipulation thereof. The foot pedal 376, mounted in any convenient location within the cab of the device, not shown, is pivoted as at 378 to any suitable portion of the frame of the device, and is connected by a cable 380 or similar element with a control means indicated generally at 382 in Figure 1, for axially moving a control rod 384, see Figure 8, which by means of the thrust bearing 192 applies a predetermined pressure to the movable clutch element 190, to thereby clamp the driving member 180 in tight frictional engagement with the clutch plates 190 and 182 splined to the spindle 130 as previously mentioned.

From the foregoing, it is believed that the manner of constructing and operating the invention will now be readily understood. The invention is especially adapted for digging holes, trenches, or making relatively shallow or narrow excavations in positions where convenient access may not be customarily had for other types of machinery. When employed for digging a ditch, the machine may slowly travel along the surface beside the ditch, with the shovel being rapidly operated to take a predetermined cut up to thirty inches in depth at a single stroke. When the desired length of excavation has been made, the device may be retracted upon itself, to make a second cut of an additional thirty inches, and the process repeated until the desired depth is obtained. It will be noted that during this excavating, the receptacle gauge will overhang the trench, while the receptacle may be lowered to the bottom of the trench to facilitate filling thereof and the removing of the material excavated.

Alternatively, the device may be employed to dig any desired depth of excavation, and may in one operation carry this depth of excavation throughout the desired length of a trench. For this purpose, the shovel may be alternately operated and the shovel guide means may be alternately lowered until the desired depth has been dug, and this operation repeated throughout the length of the trench.

The shovel may obviously be operated at any desired rate of speed, 60 cycles per minute being satisfactory in the embodiment shown, and during this operation not only penetrates and breaks the ground, but lifts the same and discharges the excavated material into a receptacle. Both the mechanism for effecting the downward reciprocating movement of the shovel together with the mechanism for imparting the arcuate movement thereto are provided with overload release means for disconnecting the driving engagement upon the encountering of an obstacle to either movement. It is here emphasized that once an obstacle is encountered and further movement stopped, the shovel is automatically withdrawn and then automatically readjusted for further use.

Since the device excavates on one side thereof, and since the framework overhangs the excavation in order to facilitate the digging and removal of the excavated material, a suitable counterweight indicated at 386 of any suitable mass may be attached in any desired manner to the opposite side of the truck for balancing the same.

An irreversible worm gear differential drive for the truck is relied upon to prevent movement of the truck during operation of the shovel.

Since numerous modifications will readily occur to those skilled in the art after an examination of the foregoing specification and annexed drawings, it is not intended to limit the invention to the exact construction shown and described, but all suitable modifications and equivalents may be resorted to falling within the scope of the appended claims.

Having described the invention what is claimed as new is:

1. An excavating machine including a supporting frame, a shovel mounted on said frame and having a handle extending longitudinally therefrom, means for imparting a substantially vertical rectilinear reciprocation to said handle, further means for effecting an arcuate movement of said shovel during operation of said first means, a common driving mechanism for both means, said further means including a cable secured at one end to said shovel handle and having its other end secured to said frame, mechanism intermediate the ends of said cable for periodically applying a lateral movement to said cable for arcuately moving said shovel.

2. The combination of claim 1 including an overload yieldable device mounted upon said frame, said other end of said cable being secured to said overload yieldable device.

3. An excavating machine including a supporting frame, a spade-like shovel mounted on said frame and having a handle extending longitudinally therefrom, means for imparting a substantially vertical rectilinear reciprocation to said handle, further means for effecting an arcuate movement of said shovel during operation of said first means, a common driving mechanism for both means, said first means including a vertically adjustable support, a slide guided for longitudinal movement on said support, said shovel handle being pivoted to said slide, actuating means for vertically reciprocating said slide, means for vertically adjusting said support.

4. The combination of claim 3 wherein said mechanism is operable during operation of said first and second mentioned means.

5. An excavating machine including a supporting frame, a spade-like shovel mounted on said frame and having a handle extending longitudinally therefrom, means for imparting a substantially vertical rectilinear reciprocation to said handle and shovel, further means for effecting an arcuate movement of said shovel during operation of said first means, a common driving mechanism for both means, said first means including a support, a slide guided for longitudinal movement on said support, said shovel handle being pivoted to said slide, actuating means for said slide comprising guide pulleys on said support, an endless cable entrained over said pulleys, said slide being secured to said cable, means for oscillating said cable, including a pulley, a shaft secured to said pulley, said cable engaging said pulley, a second pulley on said shaft, clutch means for selectively securing said second pulley in driving engagement with said shaft, driving means for said second pulley connected with said common driving mechanism.

References Cited in the file of this patent

UNITED STATES PATENTS

| | | |
|---|---|---|
| 609,449 | Miller | Aug. 23, 1898 |
| 645,175 | Libbe | Mar. 13, 1900 |
| 1,182,568 | Jamesson | May 9, 1916 |
| 1,604,656 | Mroz | Oct. 26, 1926 |
| 1,956,007 | Davin et al. | Apr. 24, 1934 |
| 2,211,194 | Baker | Aug. 13, 1940 |